No. 812,086.
PATENTED FEB. 6, 1906.
A. H. PENCE.
SAW SET.
APPLICATION FILED AUG. 22, 1904.
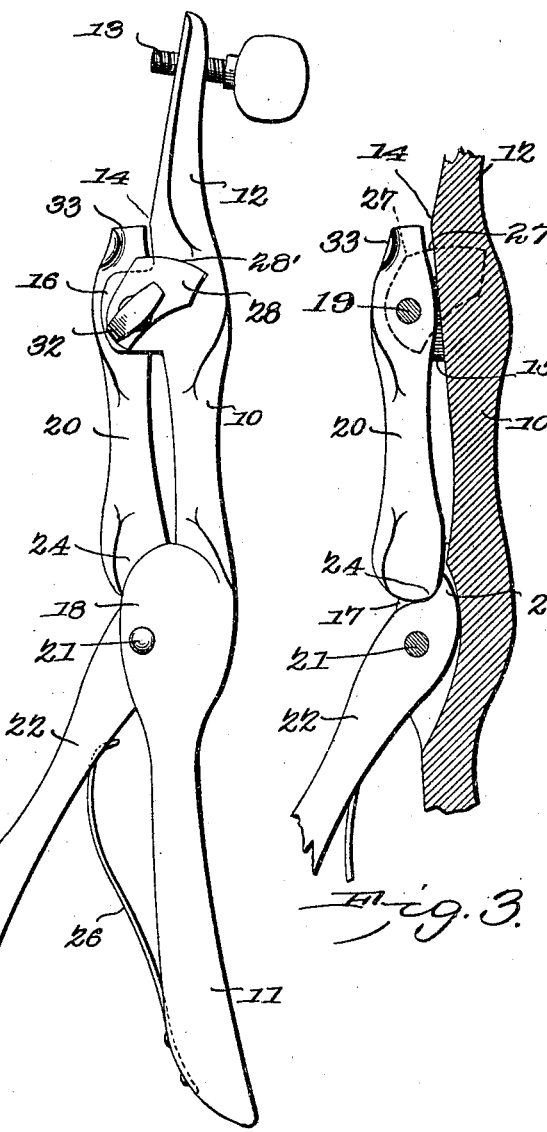
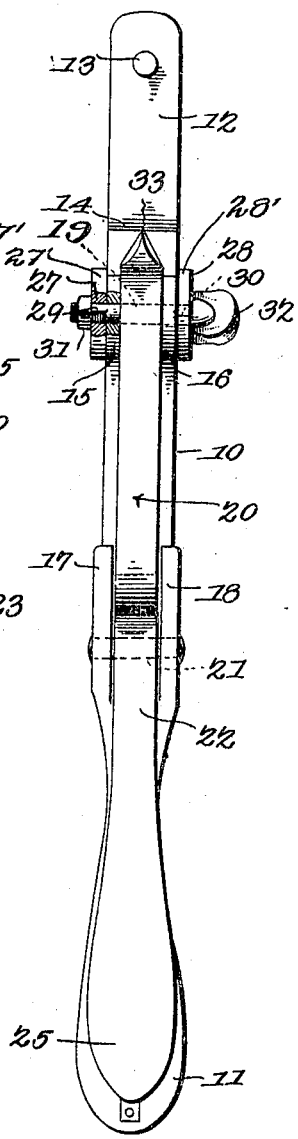
Witnesses
E. F. Stewart
C. H. Woodward.
Alonzo H. Pence,
Inventor.
by C. A. Snow & Co.
Attorneys

UNITED STATES PATENT OFFICE.

ALONZO H. PENCE, OF SOMERVILLE, ALABAMA.

SAW-SET.

No. 812,086.  Specification of Letters Patent.  Patented Feb. 6, 1906.

Application filed August 22, 1904. Serial No. 221,759.

*To all whom it may concern:*

Be it known that I, ALONZO H. PENCE, a citizen of the United States, residing at Somerville, in the county of Morgan and State of Alabama, have invented a new and useful Saw-Set, of which the following is a specification.

This invention relates to implements for setting the teeth of saws, and has for its object to produce a simply-constructed and easily applied and operated device effective in action and which may be quickly and accurately adjusted to teeth of various sizes and degrees of "pitch."

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation, and Fig. 2 is a plan view, of the implement complete and partially in section. Fig. 3 is a longitudinal sectional detail.

The improved implement comprises a stock 10, having a handle 11 at one end and inclined to the longitudinal plane of the stock at the other end, as at 12, the inclined portion having an adjusting-screw 13 operating therethrough.

The "anvil" of the implement is located at the juncture of the inclined portion and the stock, as at 14, and extending from the stock adjacent to the anvil are spaced ears 15 16, while other spaced ears 17 18 are located between the ears 15 16 and the handle portion 11.

Pivoted at 19 between the ears 15 16 is a set-lever 20, and pivoted at 21 between the ears 17 18 is an operating-lever 22, the shorter end of the lever 22 having a lip 23 extending beneath the longer end 24 of the lever 20 and the free end of the lever 22 extended into a handle 25 reversely to the handle 11. A spring 26 is disposed between the handle portions 11 25 to maintain them normally distended. Gage-plates 27 and 28 are applied to the opposite ends of the pin 19 and disposed upon the outer sides of the ears 15 and 16, the end portions of the pin being non-circular, as at 29 and 30, and the gage-plates having non-circular openings receiving these non-circular portions of the pin, so as to prevent rotation of the plates upon the pin. One projected end portion of the pin is threaded for the reception of a nut 31, while its opposite end is provided with a fixed, preferably integral, head or finger-piece 32. The gage-plates 27 and 28 have eccentric edges 27' and 28' with respect to their pivotal supports 19 and extending across the joint between the forward end of the set-lever 20 and the anvil 14. By this simple means it will be obvious that by rotatably shifting the pivot-pin 19 the gage-plates may be set at any desired point to increase or decrease the depth of the "throat" of the implement, and thus adapt it to the size of the teeth of the saw. In this connection it will be noted that the gage-plates 27 and 28 are fixed to rotate with the pin 19, and therefore the adjustment of these plates may be accomplished merely by loosening the nut 31 with one hand and turning the head 32 by the other hand, thereby simultaneously rotating the pin and the gage-plates, after which the nut 31 is tightened, so as to hold the plates fixed in their adjusted positions. It will be noted that the tightening of the nut 31 does not bind the member 20 between the ears 15 and 16, as the latter are cast upon the member 10 and cannot be drawn against the member 20 by the tightening of the nut 31.

With an implement thus constructed it is obvious that a very strong compound leverage may be exerted between the "nip" end 33 of the lever member 20 and the anvil 14 for bending or "setting" the teeth of the saws upon which it is employed.

In operating the device gage-plates 27 28 are set to correspond to the sizes of the teeth of the saw to be "set" and the implement placed with the end 33 of the set-lever 20 over each alternate tooth and the handle portion 25 of the lever 22 strongly compressed, with the result of bending the engaged tooth over the anvil 14, the screw 13 having been previously adjusted to secure the requisite pitch to the teeth. When the teeth are all set along one side, the saw is reversed and the action repeated on the other side.

The parts will preferably be of cast-steel of sufficient strength to withstand the strains to which they will be subjected. The device may be manufactured in various sizes, as required.

Having thus described the invention, what is claimed is—

1. A saw-set comprising a pair of members, a rotatably-shiftable pivot-pin piercing the members as a fulcrum connection therefor and projected at opposite sides of the members, each projected end having a non-circular portion, one terminal being provided with a finger-piece and the opposite terminal being threaded, gage-plates having non-circular openings receiving the respective non-circular portions of the pins and provided with corresponding eccentric edges extending across the joint between the pivotally-connected members, and a clamping-nut fitted to the threaded terminal of the pin.

2. A saw-set comprising a pair of coöperating jaw members, a rotatably-shiftable pin piercing one of the jaw members, a gage-plate carried by and shiftable with the pin, said plate having an eccentric edge extending across the joint between the jaws, means by which the pin and plate may be rotatably shifted, and clamping means to adjustably fix the pin.

In testimony that I claim the foregoing as my own I have hereto affixed my signature in the presence of two witnesses.

ALONZO H. PENCE.

Witnesses:
   J. A. MOORE,
   W. C. THOMPSON.